July 10, 1928.

D. G. MACKENZIE 1,676,342

VEHICLE FRAME

Filed Feb. 8, 1926

INVENTOR
D. G. Mackenzie
BY E. J. Fetherstonhaugh
ATTORNEY.

July 10, 1928.
D. G. MACKENZIE
1,676,342
VEHICLE FRAME
Filed Feb. 8, 1926     2 Sheets-Sheet 2
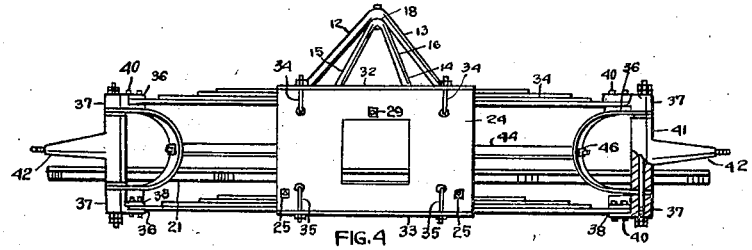
INVENTOR
D. G. MacKenzie
BY E. J. Fetherstonhaugh
ATTORNEY.

Patented July 10, 1928.

1,676,342

UNITED STATES PATENT OFFICE.

DONALD GORDON MACKENZIE, OF MONTREAL, QUEBEC, CANADA.

VEHICLE FRAME.

Application filed February 8, 1926. Serial No. 86,703.

The invention relates to a vehicle frame, as described in the present specification and illustrated in the accompanying drawings that form part of the same.

The invention consists essentially of the novel features of construction pointed out broadly and specifically in the claims for novelty following a description containing an explanation in detail of an acceptable form of the invention.

The objects of the invention are to construct a frame suitable for a light car, that will meet the exigencies incidental to road travel; to insure both rigidity and flexibility in its functions of supporting the motor and the body and in accommodating the vehicle to road inequalities entirely avoiding the ill effects of torsional strains common to motor cars; to lower the centre of gravity of the vehicle; to satisfy the demand for a comfortable small car of the kind that is easy to handle and economical in regard to purchase price and maintenance; to permit proportional design and the production in small cars of the riding qualities usually only found in large heavy automobiles; to furnish ample leg room for the passengers of a car in the construction of the body as applied to the frame; to arrange the parts in "service" units, in order to facilitate quick repairs; and generally to provide a durable, light and efficient frame for the support of the body, motor and other parts, that can be produced at a low cost without affecting the serviceability.

In the drawings, Figure 1 is a plan view of the frame.

Figure 4 is a front elevation of the frame.

Figure 5 is a rear elevation of the frame.

Figure 6 is a side elevation of the frame.

Figure 7 is a front elevation of the rear axle structure, showing the position of the body suspension bar in relation thereto.

Figure 8 is a perspective detail of the torque rod.

Figure 9 is a perspective detail of a rear axle post.

Figure 10 is a fragmentary detail of the rear post and spring axle end.

Figure 11 is a detail of the intermediate upright forming the central suspension point.

Figure 12 is a detail of a king post bracket.

Like numerals of reference indicate corresponding parts in the various figures.

Figure 1:
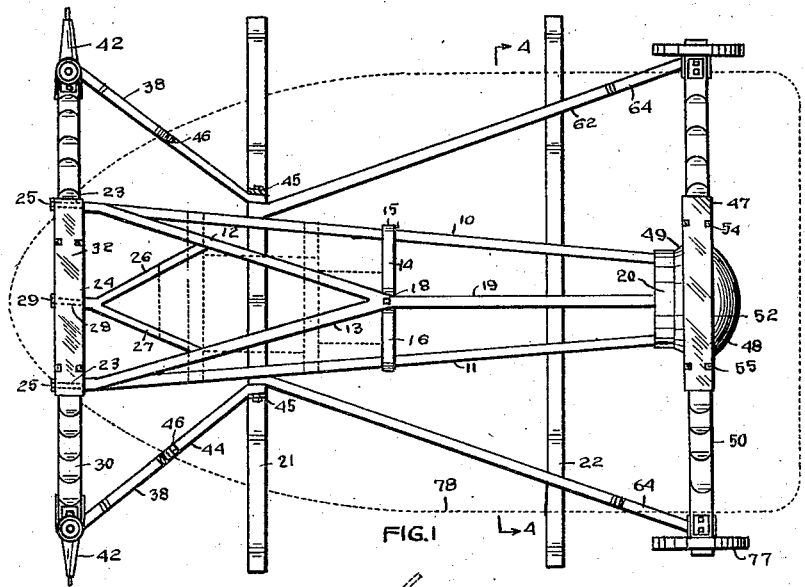

Referring to the drawings, the frame bars or tubes indicated by the numerals 10 and 11 form the lower longitudinal members and converge in relation to one another from the front to the rear of said frame. The truss bars 12 and 13 are secured to the front ends of the lower bars 10 and 11 and extend rearwardly and upwardly to join at the apex of the upright frame 14 formed of the bars 15 and 16 in triangular form, this frame bridging the longitudinal bars 10 and 11, and forming a central suspension point 18, where the several truss bars 12, 13 and 19 and frame bars 15 and 16 are rigidly secured together to form a pyramid frame.

The rear ends of the longitudinal bars 10 and 11 and the rear end of the bar 19 are rigidly secured to the journal member 20, the two longitudinals on either side at the lower end and the truss bar 19 centrally at the upper end of said journal member.

The transverse body stringer 21 is rigidly secured to the undersides of the longitudinal bars 10 and 11 between the central suspension point and the frame and the front ends of the longitudinals.

The transverse body stringer 22 is secured to the undersides of the longitudinal bars 10 and 11 between the central suspension joint of the journal member 20 and the rear ends of the bars, said stringers extending the complete width of the vehicle.

The meeting ends of the truss bar 12 and the longitudinal bars 10 and of the truss bar 13, and the longitudinal bar 11 have the threaded angle pins 23 extending therefrom and through corresponding holes in the front bracket 24 and secured thereto by the nuts 25. The brace rods 26 and 27 extend from the truss bars 12 and 13 respectively and meet centrally in the upper portion of the bracket 24 and are secured thereto by the threaded angle pin 28 and nut 29.

The leaf springs 30 and 31 are secured to the top and bottom of the bracket 24 by the plates 32 and 33 and straps 34 and 35; these springs extending from both ends of the bracket top and bottom.

The king post brackets 36 are each formed with a ringed end 37, and a socket 39, said sockets being adapted to receive the several ends of the springs 30 and 31, and secured thereto by the bolts 40. The king posts 41 are rigidly secured to the ringed ends 37 and form bearings for the wheel spindles 42.

The stirrups 38 are pivoted to the longitudinal bars 10 and 11 at their junctions with the stringer bar 21 and adjusting torque rods 43 and 44 pivotally mounted on the bearings 45 secured to the stringer 21 and thereby tying the ends of the spring axles 30 and 31 to the main frame, said torque rods 43 and 44 are inserted through the stirrups 38 and held by the adjusting nuts 46.

The rear bracket 47 includes the differential casing 48 and this differential casing 48 is formed with the bearing 49 on which the journal member 20 is mounted. The rear leaf springs 50 and 51 are secured to the rear bracket 47 by the plates 52 and 53 and the straps 54 and 55 on the top and bottom thereof respectively.

The springs 50 and 51 extend from both ends of the rear bracket 47 to agree with the springs 30 and 31 and form the rear axles.

Each of the rigid axle posts 56 is formed with the central shaft bearings 57 and top and bottom jaws 58 and 59 respectively, for the ends of the springs 50 and 51 and vertical side walls or flanges 60 and 61 to which the adjustable torque rods 62 and 63 are secured at their forked ends 64, the other ends of said rods being spring axles to the longitudinal bars 10 and 11 at the same junction points as the torque rods 43 and 44.

The motor 65 may be carried in the front in the double truss portion of the main frame between the truss bars 12 and 13 or elsewhere if desired, and the shaft 66 of the motor extends rearwardly through the centre of the bearing 20 into the differential casing 48 where it carries the pinion 67 coacting with the crown gear 68 as usual. The crown gear 68 drives through the conventional differential the axle shafts 69 through the two universal joints 70 and 71 on either side of the machine and the wheel axles 72 are splined to the axle shafts 69 as customary and extend into the shaft bearing 57 and the post 56.

The rear wheels 73 are offset inwardly from the hubs 74 to bring the treads 75 directly under the clamped ends of the springs 50 and 51, the same construction occurring with the front wheels, thereby reducing to the minimum any jar incidental to steering and driving stresses.

The brake rubbing members 77 are shown as mounted on the hub 74, but the drum is not described as in this application the construction is intended to be confined to the frame and only the essential subsidiaries are described in detail though in themselves they form principal elements in copending applications for separate patents.

Figure 2:
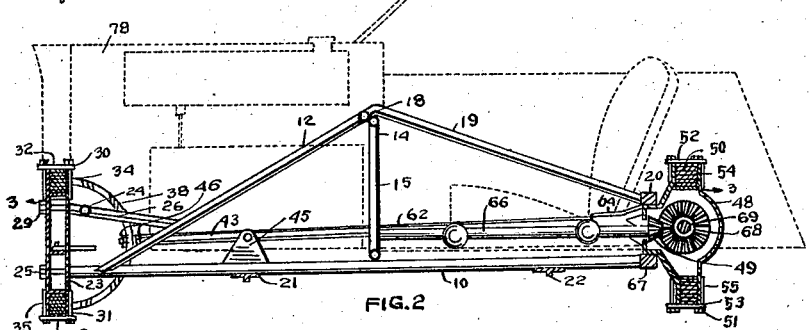
Figure 2 is a longitudinal mid-section of the frame.
Figure 3:
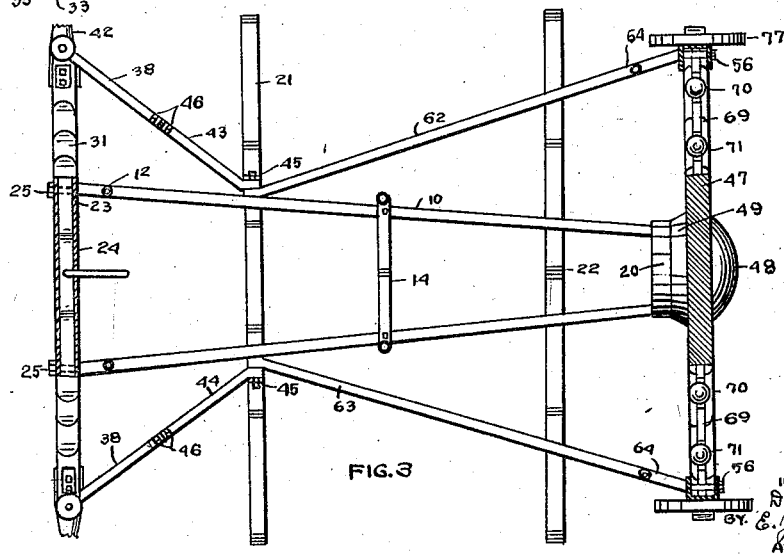
Figure 3 is a horizontal sectional view of the line 3—3 in Figure 1.

The outline of the body 78 is shown in Figures 1 and 2 but as the construction of the body is a thing separate to itself no further description of the same is made herein.

In the operation of the car of which this frame forms a part it will be seen that the motor is carried in an extremely rigid part of the frame, wherein the short torque rods, front frame, brakes, transverse body stringer longitudinal bars and rods are the flexible connections to the resilient axles, therefore vibratory movements are comparatively few.

The shaft as explained extends centrally through the frame and frame bearings, thus in coaction the crown gear and pinion are to all intents and purposes a unit with said frame.

It will also be seen that in road inequalities the rear axles may be at an entirely different angle from the front axles without affecting the driving powers or the position of the main frame, all torsional strains being taken up by the torque rods, thereby eliminating the body stresses common to motor cars, the rear running gear assuming different positions in relation to the front running gear due to longitudinal bearing which permits the rear axle to be in an entirely different plane to the front without causing any distortion of springs or frame.

What I claim is:—

1. In a vehicle frame, a pyramidical frame work, body stringers extending transversely under and beyond said frame work and rigidly secured thereto, front and rear supports for said frame work and torque rods secured to said stringers adjacent to said frame and extending therefrom to the ends of said supports.

2. In a vehicle frame, a frame work having an elevated central point for body suspension and bars extending frontwardly and rearwardly therefrom to join the main longitudinal bars, transverse body stringers under said frame and secured thereto, front and rear supports for said frame and tie rods from said supports to said frame.

3. In a vehicle frame, a pyramidical frame having a journal member at the rear end and transverse body stringers secured thereto, a rear axle structure supporting a bearing for said frame, front axle structure having a central bracket rigidly secured to said frame, and torque rods extending from the front axle structure to the main frame and from the main frame to the rear axle structure.

4. In a vehicle frame, longitudinal bars, intermediate uprights meeting over said longitudinal bars, truss bars extending from the front ends of said longitudinal bars and joined to the junction of said uprights, a truss bar extending from said junction rearwardly, a journal member rigidly secured to the rear truss bar and to the longitudinal bars, transverse body stringers secured to the frame, a front bracket rigid with the front ends of said frame, brace bars extending from the front truss bars and meeting centrally in said bracket and secured thereto and a rear axle bracket resiliently supported and forming a longitudinal bearing for said journal end.

5. In a vehicle frame, a pyramidical frame having bars extending downwardly frontwardly and rearwardly from a central suspension point and having a journal at the rear end and transverse body stringers secured to its horizontal bars, a central bracket rigidly secured to the front end of the frame, flexible members extending longitudinally of said bracket, a rear bracket having a distancing member forming a bearing for said journal end, and flexible members extending from said rear bracket.

6. In a vehicle frame, a frame work formed of longitudinals, uprights and truss bars having body stringers secured thereto, a pivot mounting for said frame at the rear end, a rigid support for said frame at the front end, resilient members from the rigid support on either side forming upper and lower supports, resilient members at either side of said rear pivot mounting at the upper and lower ends, and torque rods secured with said resilient members and extending to the longitudinals and from there to the rear resilient members.

7. In a vehicle frame, a plurality of bars forming a trussed frame terminating at its rear end in a pivot mounting and at its front end in a rigid mounting, transverse resilient members supporting said mountings and rigidly spaced at the ends, stirrup connections secured to the rigid spacers and extending therefrom, and torque rods secured to said stirrups and pivoted to the main frame.

8. In a vehicle frame, a plurality of bars forming a trussed frame having a pivot mounting at one end and at the other ends a rigid mounting and front and rear transverse body stringers, transverse spring supports for said rigid mounting, transverse spring supports carrying a central bracket, a pivot bearing forming the rear frame support, spacers for the front and rear springs, torque rods from the ends of said front springs to the junctions of the front transverse body stringer and the main frame, and rear torque rods from the same junctions and connected to the ends of the rear springs.

9. In a vehicle frame, a main frame comprising a plurality of bars forming a pyramidical structure having a pivot mounting at the rear end and a rigid plate mounting at the front end and front and rear transverse body stringers, springs supporting said rigid plate mounting, front torque rods having stirrup connections with said front springs and pivoted to the longitudinals of the main frame at the junctions of the front body stringer, a pivot bearing for said longitudinal pivot mounting and transverse springs rigidly joined at the ends and secured to said pivot bearing, and torque rods from the aforesaid junctions having forked ends joined to said rigid ends of the rear springs.

10. In a vehicle frame, a pyramid frame formed of converging longitudinal members, a triangular upright, three suspension members from the apex of said upright, braces and front and rear brackets.

11. In a vehicle frame, a ring forming the rear end of the frame, a double plate bracket forming the front end of the frame, longitudinal bars joining the lower portions of said ring and said bracket and a truss and brace structure secured to said longitudinals, rear ring and front bracket.

12. A vehicle frame, comprising an assembly of rods in pyramidical form having angular uprights, trusses and braces forming with the front portions of the longitudinal members and body stringer a motor cage.

Signed at Montreal, Canada, this 16th day of November, 1925.

DONALD GORDON MACKENZIE.